(12) United States Patent
Ziemba

(10) Patent No.: US 11,614,168 B2
(45) Date of Patent: Mar. 28, 2023

(54) PARK LOCK ROLLER ASSEMBLY

(71) Applicants: LINAMAR CORPORATION, Guelph (CA); Jefferey Ziemba, Novi, MI (US)

(72) Inventor: Jefferey Ziemba, Novi, MI (US)

(73) Assignee: Linamar Corporation, Guelph (CA)

( * ) Notice: Subject to any disclaimer, the term of this patent is extended or adjusted under 35 U.S.C. 154(b) by 0 days.

(21) Appl. No.: 17/288,713

(22) PCT Filed: Oct. 25, 2019

(86) PCT No.: PCT/US2019/058107
§ 371 (c)(1),
(2) Date: Apr. 26, 2021

(87) PCT Pub. No.: WO2020/086984
PCT Pub. Date: Apr. 30, 2020

(65) Prior Publication Data
US 2021/0404555 A1    Dec. 30, 2021

Related U.S. Application Data

(60) Provisional application No. 62/750,533, filed on Oct. 25, 2018.

(51) Int. Cl.
*F16H 63/34*    (2006.01)
(52) U.S. Cl.
CPC .............................. *F16H 63/3425* (2013.01)

(58) Field of Classification Search
CPC ....................................... F16H 63/3416–3491
See application file for complete search history.

(56) References Cited

U.S. PATENT DOCUMENTS

| 2,974,752 | A | * | 3/1961 | Howard | ................. B60T 1/005 |
| | | | | | 188/69 |
| 10,962,113 | B2 | * | 3/2021 | Kramer | ................. F16D 63/006 |
| 2019/0211928 | A1 | | 7/2019 | Puiu et al. | |

FOREIGN PATENT DOCUMENTS

| CN | 103807434 A | * | 5/2014 | ......... F16H 63/3425 |
| CN | 108278365 | | 7/2018 | |
| DE | 10131735 | | 1/2003 | |
| DE | 202017102386 | | 4/2018 | |
| EP | 2960552 | | 12/2015 | |
| WO | WO-2012076250 A1 | * | 6/2012 | ............. B60T 1/005 |
| WO | WO-2019001642 A1 | * | 1/2019 | ......... F16H 63/3433 |
| WO | 2019/200099 | | 10/2019 | |

* cited by examiner

*Primary Examiner* — Huan Le
*Assistant Examiner* — James J Taylor, II
(74) *Attorney, Agent, or Firm* — Miller Canfield

(57) ABSTRACT

A park lock roller assembly (10) includes at least one roller (12), a shaft rod (16), and a guide plate (14). The roller (12) is rotably coupled to one of the shaft rod (16). The shaft rod (16) is located within the guide plate (14) for longitudinal movement relative thereto. The park lock roller assembly (10) is pulled towards a pawl (30) to actuate the pawl (30) into locking engagement with a locking gear (38) to reliably lock a vehicle transmission in a parked position.

14 Claims, 3 Drawing Sheets

PARK LOCK ROLLER ASSEMBLY

CROSS-REFERENCE TO RELATED APPLICATIONS

This application claims priority to and all the benefits of U.S. Provisional Patent Application No. 62/750,533, filed Oct. 25, 2018, the disclosure of which is hereby incorporated by reference in its entirety.

BACKGROUND OF THE INVENTION

1. Field of the Invention

The present invention relates to a park lock roller assembly for selectively locking a gear of a vehicle transmission between an unlocked and locked position.

2. Description of the Related Art

It is commonly known for a transmission of a vehicle to include a park lock mechanism for electronically or manually shifting the vehicle into a parked position by locking a gear in the transmission. The park lock mechanism typically includes a shift lever and rod actuated by the vehicle operator for actuating a park lock rod assembly between an unlocked position and a locked position camming a pawl member into engagement with a parking lock gear to prevent rotation thereof and lock the transmission in a parked position. An example of a park lock mechanism is disclosed in U.S. Pat. No. 5,295,412.

The park lock rod assembly includes a rod and a spring loaded and captured in a guide member between the shift lever and the pawl member. The park lock rod assembly is typically pushed longitudinally during actuation towards the pawl member to force the pawl member to the locked position with the parking lock gear.

It is desirable to provide a park lock roller assembly which is pulled laterally towards the pawl member for actuation between the unlocked and locked positions to improve strength and packaging requirements.

SUMMARY OF THE INVENTION

According to one aspect of the invention, a park lock roller assembly is provided for actuating a pawl into locking engagement with a park lock gear to lock a vehicle transmission in a locked position. The park lock roller assembly includes at least one roller and a guide plate, wherein the roller is attached to the guide plate. The park lock roller assembly further includes a shaft rod, the shaft rod being located within the guide plate. The park lock roller assembly is pulled towards a pawl causing the pawl to engage with a locking gear to lock the vehicle transmission in the locked position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Referring now to the Figures, the invention will be described with reference to specific embodiments, without limiting same, and wherein like numerals indicate like or corresponding parts throughout the several views.

Figure 1:
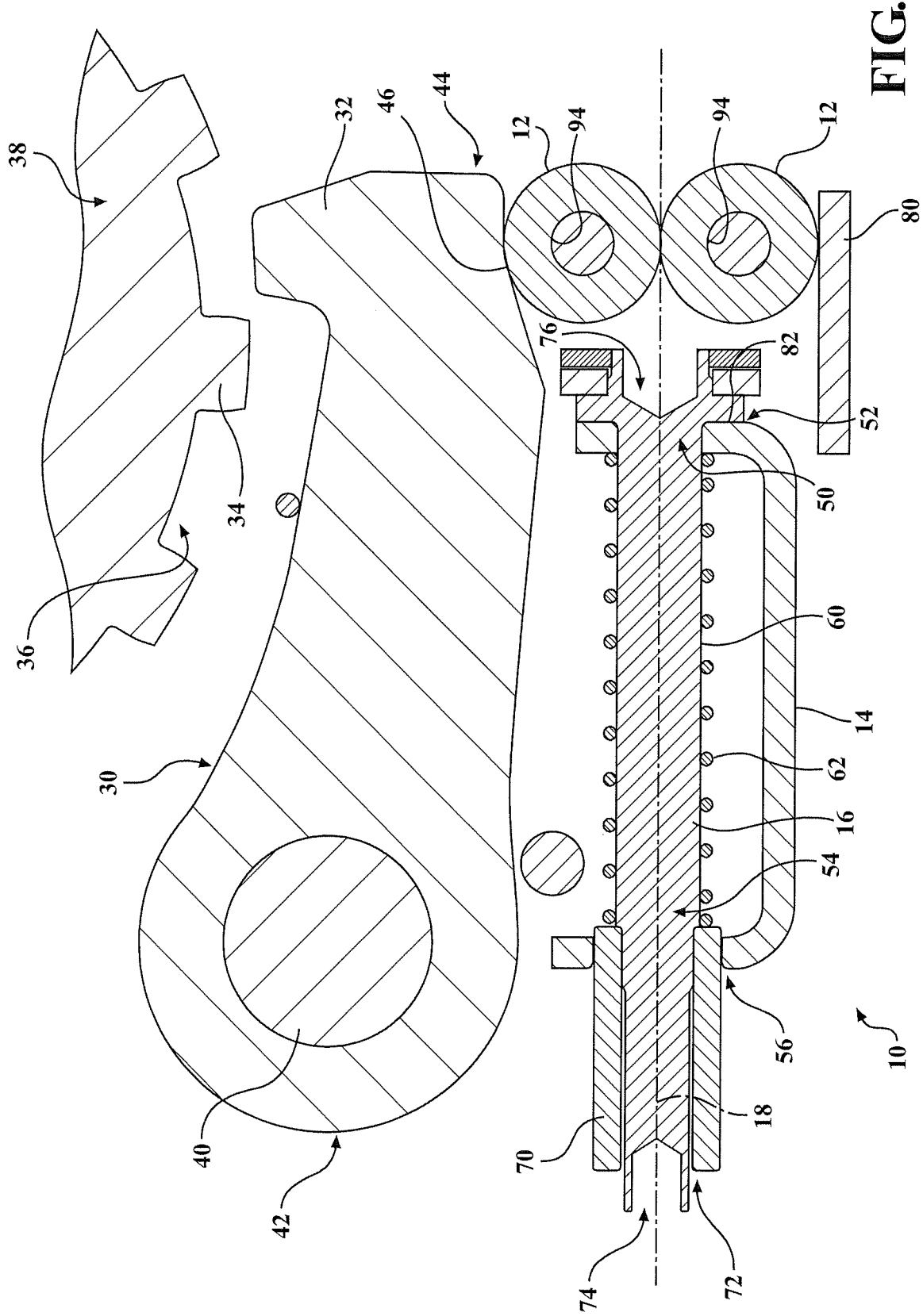
FIG. 1 is a cross-sectional view of a park lock roller assembly in an unlocked position.
Figure 2:
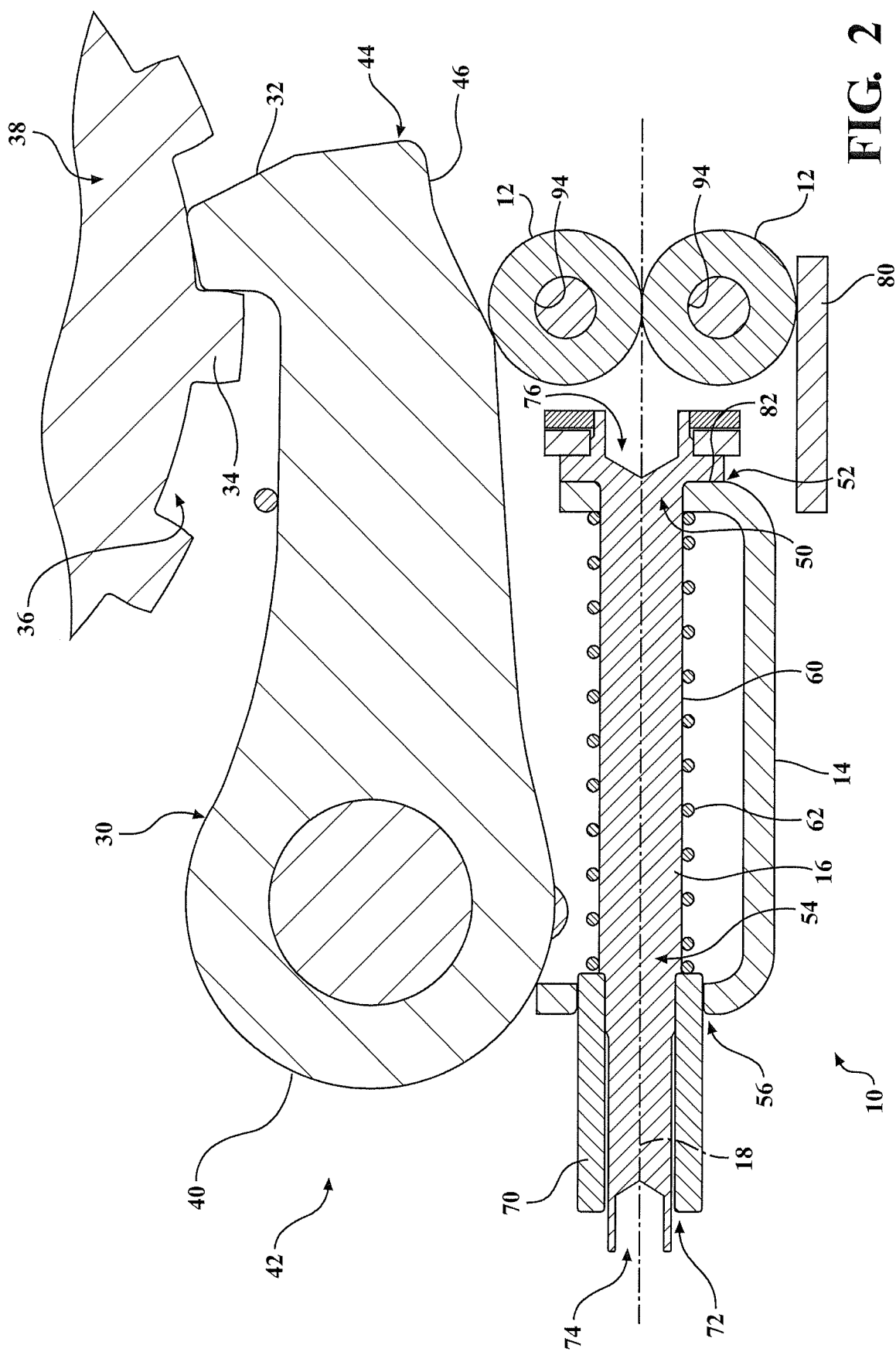
FIG. 2 is a cross-sectional view of the park lock roller assembly in a locked position.
Figure 3:
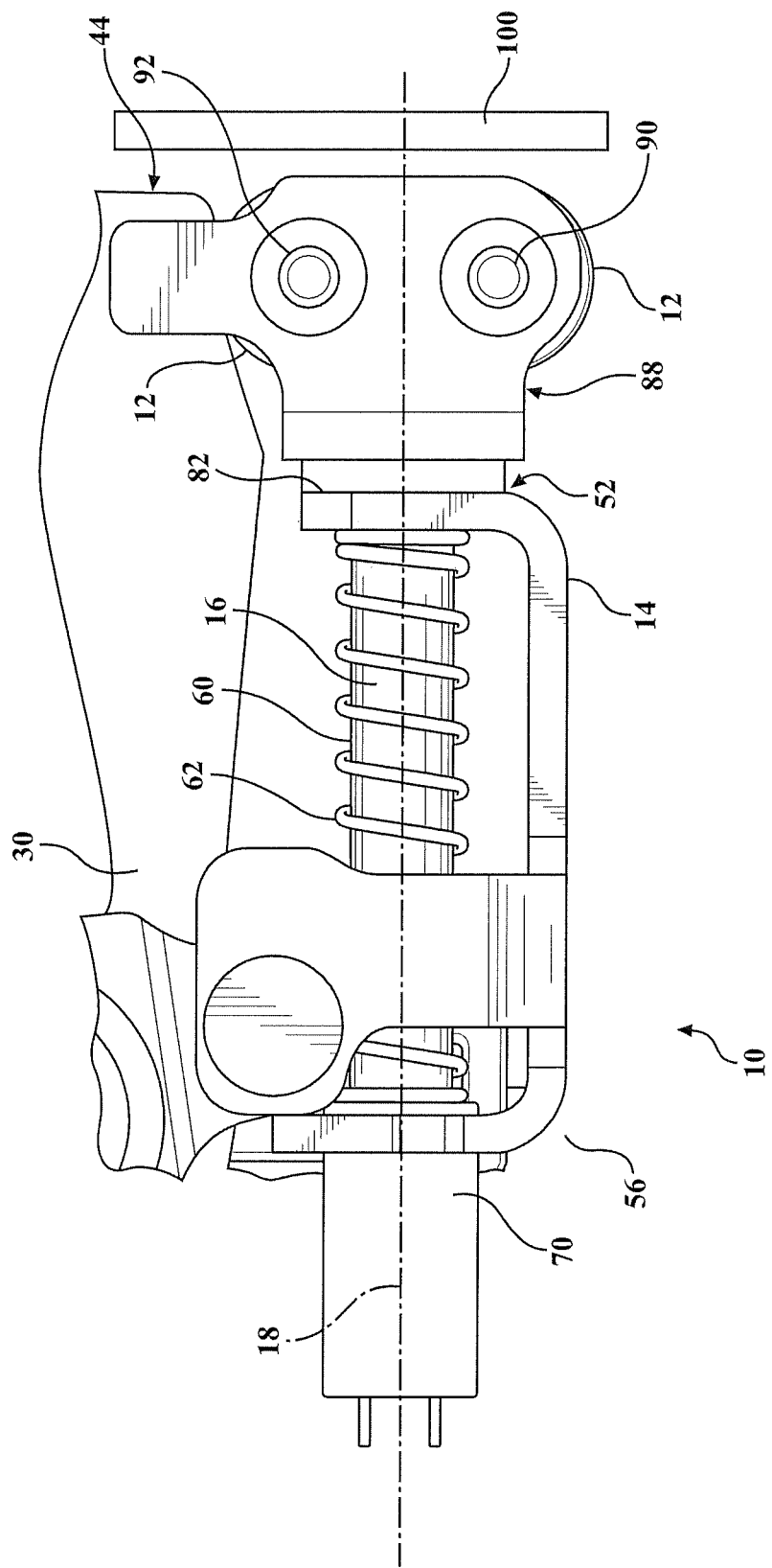
FIG. 3 is side view of the park lock roller assembly.

Referring to FIGS. 1-3, the present invention relates to a park lock roller assembly 10 for selectively locking a vehicle transmission in a locked, or park, position. The park lock roller assembly 10 includes a set of rollers 12, a guide plate 14, and a shaft rod 16. The rollers 12 are rotatably attached to the shaft rod 16 and the shaft rod 16 is located within the guide plate 14. The guide plate 14 acts as a support for the entire park lock roller assembly 10 as the rollers 12 and shaft rod 16 move longitudinally from one position to another position along a central axis 18.

During actuation between an unlocked and locked position, the park lock roller assembly 10 is pulled towards a pawl 30. The pawl 30 has a locking tooth 32 for selectively engaging between a plurality of teeth 34 on an outer surface 36 of a locking gear 38 to the lock the transmission in the locked, or Park, position. The pawl 30 is pivotally mounted to a bracket 40 at a second end 42 adjacent the park lock roller assembly 10. The pawl 30 further includes a first end 44 opposite the second end 42. The first end 44 defines a ramped surface 46 engaged by the park lock roller assembly 10.

The park lock roller assembly 10 is assembled in a manner which allows the rollers 12 to be pulled towards the ramped surface 46 of the pawl 30 rather than pushed. This allows for flexibility and package benefits as further described below.

Referring to FIG. 1, the guide plate 14 is shown having a first opening 50 at a first end 52 and a second opening 54 at a second end 56. The shaft rod 16 is inserted axially through the first opening 50 and second opening 54 of the guide plate 14 when the park lock assembly 10 is fully assembled. The shaft rod 16 has an outer surface 60 which is in contact with a spring rod 62. The spring rod 62 extends and is compressed between the first end 52 and the second end 56 of the guide plate 14. The spring rod 62 creates a pressure which allows the park lock roller assembly 10 to return to an unlocked position by pushing the rollers 12 back down the ramped surface 46 of the pawl 30.

The park lock assembly 10 further includes a collar 70. The collar 70 is attached to the second end 56 of the guide plate 14. The collar 70 has a central opening 72 through which a second end 74 of the shaft rod 16 passes through. The second end 74 being opposite a first end 76 of the shaft rod 16. The collar 70 allows for a large span for the shaft rod 16 to be controlled along the central axis 18. The collar 70 also has the purpose of holding the spring rod 62 between the first end 52 and second end 56 of the guide plate 14. Finally, the collar 70 acts as a support for the shaft rod 62.

An abutment plate 80 is shown in contact with the roller 12. The abutment plate 80 assures the movement of the park lock roller assembly 10 is restricted to movement along the central axis 18.

Further included is a U-shaped collar 82 located at the first end 76 of the shaft rod 16. The collar 82 couples the rollers 12 to the shaft rod 16 to provide axially movement therewith. The collar 82 forms a rivet swage feature making the coupling more robust as well as removing the need for a washer or other faster between the rollers and shaft rod 16 which many prior assemblies typically require.

Referring to FIG. 3, a roller bracket 88 is shown attaching the first end 52 of the shaft rod 16 to the rollers 12. The roller bracket 88 includes a first rod 90 and a second rod 92. The first rod 90 and second rod 92 each passing through a central opening 94 in each of the rollers 12 of the park lock roller assembly 10. The rollers 12 then being able to rotate about a rod axis 96, the rod axis 96 being a central point on each of the first rod 90 and second rod 92.

In operation, movement of the shaft rod 16 along the central axis 18 is translated to the roller bracket 88. The roller bracket 88 pulls the rollers 12 along the ramped surface 46 of the pawl 30. The rollers 12 rotate about the rod axis 96 to roll along the ramped surface 46. Movement of the rollers 12 up the ramped surface 46 pivots the pawl 30 about the bracket 40 to force the locking tooth 32 of the pawl 30 into engagement with the teeth 34 on the outer surface 36 of the locking gear 38 placing the park lock roller assembly 10 into the locked position as shown in FIG. 2. The park lock roller assembly 10 is unlocked when the spring rod 62 pushes the rollers 12 back down the ramped first end 44 of the pawl 30 disengaging the locking tooth 32 of the pawl 30 from the teeth 34 of the locking gear 38.

In order to prevent the park lock roller assembly 10 from moving along the central axis 18 to a point where contact between the rollers 12 extends beyond the first end 44 of the pawl 30, a stop feature 100 is included. Thus stop feature 100 prevents the rollers 12 from disengaging with the pawl 30.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A park lock mechanism including a park lock roller assembly, a pawl, and a locking gear, the park lock roller assembly comprising:
    at least one roller,
    a guide plate, the guide plate including a first opening at a first end and a second opening at a second end, and
    a shaft rod rotatably supporting the at least one roller, the shaft rod being located and longitudinally supported within the guide plate, wherein the shaft rod is inserted through the first opening and second opening of the guide plate, wherein a first end of the shaft rod is attached to the roller via a roller bracket, the roller bracket allowing the shaft rod to act as a back stop,
    wherein the pawl has a first end and a second end, the first end having a ramped surface and the second end being pivotally mounted via a bracket adjacent the second end of the guide plate of the park lock roller assembly, the park lock roller assembly being pulled towards the second end of the pawl along the ramped surface causing the first end of the pawl to engage with the locking gear of a vehicle transmission and lock the transmission in a locked position, wherein the shaft rod has an outer surface, the outer surface being in contact with a spring rod, the spring rod extending from the first end of the guide plate to the second end of the guide plate to bias the park lock roller assembly to an unlocked position with the pawl disengaged from the locking gear, and
    a stop feature seated adjacent the roller bracket for engaging the roller bracket and preventing the park lock roller assembly from moving longitudinally along a central axis away from the second end of the pawl to a point wherein the roller would disengage with the ramped surface of the pawl.

2. The park lock mechanism of claim 1, wherein the pawl has a locking tooth at the first end.

3. The park lock mechanism of claim 2, wherein the locking gear includes a plurality of teeth on an outer surface, the teeth selectively engaging with the locking tooth of the pawl to lock the transmission of a vehicle into a park position.

4. The park lock mechanism of claim 3, wherein the guide plate acts as a support for the park lock roller assembly as the roller moves from one position to another along the central axis.

5. The park lock mechanism of claim 4, wherein a collar is attached to the second end of the guide plate.

6. The park lock mechanism of claim 5, wherein the collar has a central opening through which a second end of the shaft rod passes through, the second end of the shaft rod being opposite the first end of the shaft rod.

7. The park lock mechanism of claim 6, wherein the collar allows for a large span for the shaft rod to be controlled along the central axis, the collar also holding the spring rod within the first end and second end of the guide plate.

8. The park lock mechanism of claim 7, wherein the collar further acts as a support for the shaft rod.

9. The park lock mechanism of claim 8, wherein:
    the at least one roller including a second roller, the second roller rotationally coupled to the roller bracket; and
    the roller bracket has a first rod and a second rod, each of the first rod and the second rod passing through a central opening in the respective rollers of the park lock roller assembly.

10. The park lock mechanism of claim 9, wherein each of the rollers rotates about a respective rod axis, the rod axis being a central point on each of the first rod and second rod.

11. The park lock mechanism of claim 10, wherein movement of the shaft rod along the central axis is translated to the roller bracket, the roller bracket pulling the roller along the ramped first end of the pawl, the roller rotating about the rod axis, bringing the locking tooth of the pawl into contact with the locking gear.

12. The park lock mechanism of claim 11, wherein an abutment plate is in contact with at least one of the rollers restricting lateral movement of the park lock roller assembly to movement along the central axis.

13. The park lock mechanism of claim 12, wherein a joint is included at the first end of the shaft rod.

14. The park lock mechanism of claim 13, wherein the joint has a rivet swage feature.

* * * * *